FRANK J. MALINA
AND
MARK M. MILLS
INVENTORS

May 14, 1946.   F. J. MALINA ET AL   2,400,242
MOTOR
Filed July 15, 1943   2 Sheets-Sheet 2

FRANK J. MALINA
AND
MARK M. MILLS
*INVENTORS*

BY

AGENT

Patented May 14, 1946

2,400,242

UNITED STATES PATENT OFFICE 2,400,242

MOTOR

Frank J. Malina and Mark M. Mills, Pasadena, Calif., assignors to Aerojet Engineering Corporation, Azusa, Calif., a corporation of Delaware Application July 15, 1943, Serial No. 494,864

3 Claims. (Cl. 220—89)

Our invention pertains to rocket motors and especially to means for increasing the safety of operation of such motors.

In its usual form, a reaction motor comprises a chamber having a nozzle in the wall thereof, a combustible charge within the chamber, and means for igniting the charge whereby gases at high pressure may be produced within the chamber and expelled through the nozzle. As gas is expelled from the nozzle into the surrounding medium it reacts on the motor thus producing a thrust which may be utilized to accelerate or decelerate a vehicle on which the motor is mounted.

Such a combustible charge generally comprises both a fuel and an oxidizer and is known as a propellant.

In its most practical form, the propellant used in rocket motors is of a slow-burning type, and means are provided for limiting the burning of the propellant to a restricted area of the surface of the propellant charge. Such a slow-burning propellant may, for example, comprise a mixture of ammonium nitrate, gunpowder, and dextrin.

If such slow-burning propellant is pressed into a liner composed of soft paper of the shape of the chamber into which the charge is to be placed, and the propellant is bonded with the paper wherever they contact each other, the charge will burn over the limited surface area thereof which is not covered by the liner.

In one type of rocket motor the motor chamber itself is a cylinder of circular cross-section and the paper liner is also a cylinder of circular cross-section and of such a size as to fit snugly within the chamber. One end of such cylindrical charge is free of paper. When the propellant is ignited at that end it normally burns slowly over a circular section of the charge and in an axial direction until the entire charge is consumed.

During such burning process, the gaseous products of combustion escape from the nozzle, thereby producing thrust on the motor throughout an extended burning period. The maximum value of the normal operating pressure of the gas in the chamber, when restricted burning occurs, will be referred to hereinbelow as the normal value.

Regardless of the care with which such propellants and liners are prepared, occasional failures will occur, and the propellants consequently burn over a larger area than the limited cross-sectional area intended. When such failure does occur, abnormally high pressures are produced in the combustion chamber. If, as frequently happens in such cases, such abnormal pressures exceed the strength of the chamber, the chamber bursts and serious consequences ensue.

It is the principal object of our invention to provide an improved rocket motor having means for releasing dangerous or abnormally high pressure gas with safety.

In order to achieve the desired result, we provide means responsive to a chamber pressure exceeding a predetermined value for providing communication between the interior of the chamber and the surrounding medium when the chamber pressure exceeds that value. In the preferred form of our invention, the gases are released through an auxiliary (safety) port in the wall of the chamber, the dimensions of which port are so proportioned with respect to the minimum cross-sectional area of the nozzle throat and the total surface area of the charge and the limited charge area over which burning normally occurs, that when such port is open and the charge is burning over the entire surface area thereof the chamber pressure is at about its normal value. To achieve this result the ratio of port area to minimum nozzle throat area is made about equal to the ratio of the part of the charge area over which burning does not normally occur to the part over which burning normally occurs.

In order to avoid the production of thrust on the motor due to the escape of gases through the safety port we provide means whereby such gases escape from auxiliary orifices communicating with said port in such different directions and at such rates that the reaction forces of the gases escaping from said orifices substantially neutralize each other. A cap having a plurality of such orifices is here called a thrust neutralizing cap.

While our invention is described herein in conjunction with solid propellant charges and a specific rocket motor, it is to be understood that variations may be made in accordance with the principles set forth herein without departing from the scope of our invention as defined in the appended claims.

Our invention may be more readily understood by reference to the following description taken in conjunction with the accompanying drawings wherein.

Figure 1:
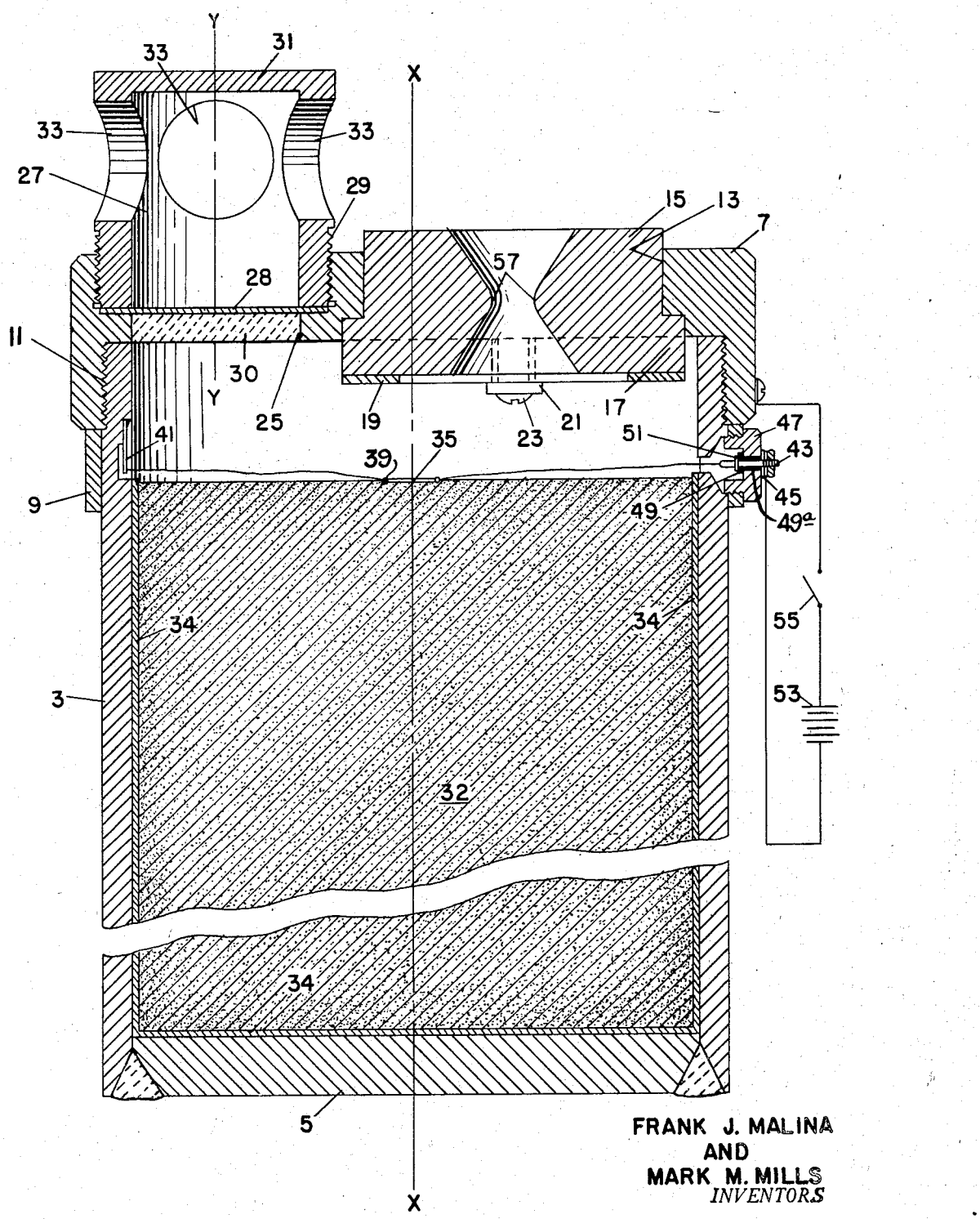
Fig. 1 is a side elevation, partly in section and partly schematic, of a rocket motor incorporating our invention.
Figure 2:
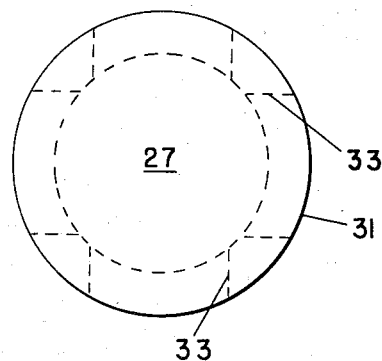
Fig. 2 is a plan view of a safety cap.
Figure 3:
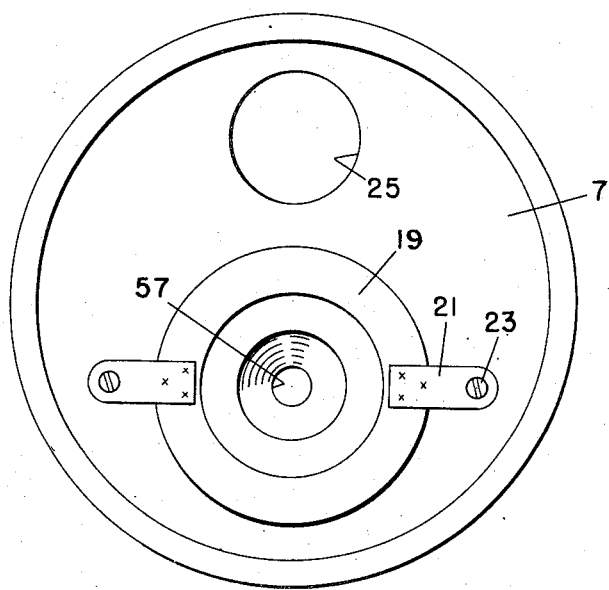
Fig. 3 is a plan view of the rocket motor cap as viewed from the interior of the rocket motor.

As illustrated in Fig. 1, a rocket motor of a type to which our invention is applicable comprises a cylindrical combustion chamber, the wall of which is formed by a hollow cylindrical body member 3 closed at one end by a steel end plate 5 welded to said tubular member and capped at the other end by a rocket motor cap 7. The cylindrical member 3, end plate 5, and motor cap, are preferably made of steel. Said cap is secured to the motor at said end by means of threads 11 at the end of said tubular member and on said cap.

The tubular member has an annular shoulder 9 near the capped end thereof to facilitate mounting on an aircraft or other vehicle by means not shown.

In the cap there is a circular countersunk bore 13 into which a converging, diverging nozzle 15 of the De Laval type fits. Said nozzle has a shoulder 17 adapted to fit into the wide portion of said countersunk bore. The nozzle is held in place by means of a holding ring 19, on opposite sides of which there are welded two ears 21, 21 through which holding screws 23 extend into the cap wall.

In the motor cap wall there is also a safety port formed by a bore 25. Said bore is countersunk externally and threaded to receive and hold a thrust neutralizing (safety) cap 27.

Pressure responsive means such as diaphragm 28 is adapted to maintain said port closed as long as the pressure in the chamber is below a predetermined safe value. Said diaphragm 28 is pressed tightly against the bottom of the enlarged portion of the bore 25 by means of the safety cap, thus sealing the port. Said diaphragm either has a melting point above that of the gas in the chamber or is protected by a layer 30 of heat resistant material on the high pressure side thereof. Such fire-resistant coating may be made by preparing a putty-like mixture of fireclay and glycerin, and pressing some of this mixture into the safety port on the chamber side thereof. This mixture thus forms a coating which flows readily so that the predetermined pressure at which the port opens is determined primarily by the characteristics of the diaphragm.

In the form shown the safety cap has a hollow cylindrical tubular wall 29 which extends beyond the motor cap surface and is closed by an external end wall 31. A plurality of orifices 33 of uniform size are equally spaced around and extend through said tubular wall 29.

A cylindrical propellant charge 32 is enclosed within the rocket motor chamber with one end 34 thereof butted against the end plate 5. This charge is adapted for restricted burning over the open unbonded end 35 remote from the end plate. In the present case means such as soft paper to which the charge is bonded on the cylindrical surface thereof and the end thereof contacting the end plate 5, restricts the burning to a circular area of the charge perpendicular to the axis X—X of the jet motor.

Suitable means are provided for initiating the combustion of such charge. Such means may comprise, for example, a short piece of Nichrome wire 39 embedded in the charge at its open end 35. Such Nichrome wire is connected at one end by means of a copper wire to the wall of the tubular member 3 where it is held in place by means of a clip 41, previously welded within a shallow recess in the wall opposite the collar. The other end of the Nichrome wire is connected through a copper wire to an electrical connector 43 extending through the collar 9 of the tubular member 3.

In the form shown this connector is insulated by means of a bushing 45 from the wall of a threaded insert 47 which may be screwed into an opening 49a extending through the collar of the tubular member.

A shoulder 49 is provided on the bushing and a collar 51 is provided on the connector in order to prevent the bushing and the connector from being blown out of the wall by high pressure gas within the combustion chamber.

In order to ignite the propellant a battery 53 is connected in a circuit between the connector and the wall of the chamber by closing a switch 55. Such ignition occurs when the Nichrome wire is heated by the electrical current flowing through it, thereby initiating the combustion of the propellant at the open end 35 thereof.

Normally, with restricted burning, once such combustion is initiated, the propellant burns over a circular area thereof perpendicular to the axis X—X of the cylindrical charge. As the propellant is consumed the circular cross-sectional surface over which burning occurs moves toward the closed end of the jet motor.

Figure 4:
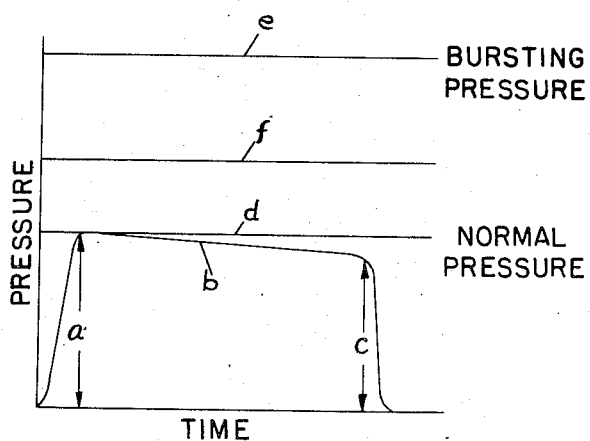
Fig. 4 is a graph showing chamber pressure as a function of time.

The manner in which chamber pressure varies with time in a typical case is represented by the graph in Fig. 4. In this graph ordinates represent pressure and abscissae represent time. In normal operation the pressure increases rapidly to a maximum value $a$, thereafter decreasing slowly as represented by the line $b$, until the charge is consumed, at which time the pressure has a value $c$. The pressure then falls off rapidly.

The maximum pressure $a$ normally produced within the rocket motor chamber when the burning of the charge is restricted is here referred to as the normal pressure. The jet motor is designed to have a bursting pressure, represented by the line $e$, well above the normal pressure.

Among the primary factors determining the normal pressure are the cross-sectional area of the nozzle throat, the limited surface area over which the propellant normally burns, and the individual characteristics of the charge itself. The cross-sectional area of the throat is measured at the narrowest part 57 thereof.

If for some reason, the means for restricting the burning to this limited area 35 should fail, extended burning will occur over a much larger area and the pressure within the chamber will be increased by a corresponding amount. Such a failure is most likely to occur at the surface of the charge which is bonded to the paper liner. In this event the chamber pressure might rise to many times the normal pressure and result in the bursting of the motor.

For this reason we select a diaphragm 28 of such materials and dimensions that it will be fractured when the pressure within the chamber reaches a predetermined value $f$ intermediate the normal chamber operating pressure $a$ and the pressure $e$ at which the chamber might burst.

In order to provide ample safety in the event that the propellant charge burns over the entire surface area, the dimensions of the port and the cap orifices are so proportioned that after the diaphragm has been fractured and said safety port opened, the pressure of the gas in the chamber will be reduced to about its normal value.

The total cross-sectional area of the orifices in the safety plug cap are generally made larger than the area of said port since this enables the use of a small port area. In this case the safety port area is the primary factor governing the rate of flow of gases through said port and said orifices.

Thus, in practice the area C of the safety port is made approximately equal to the value given by the formula:

$$C = \left(\frac{S-A}{A}\right)B \qquad (1)$$

where

S = the entire external surface area of the propellant charge,
A = area to which burning is normally restricted,
B = minimum cross-sectional area of nozzle throat.

The expression S—A appearing in Equation 1 is the external surface area of the charge over which burning is normally prevented by the restricting means. Since the charge is generally made as large as possible, substantially filling the motor chamber, the total surface area S of the charge is almost as large as the internal surface area S' of the motor chamber.

While the port area may be larger than that specified by the foregoing equation I have found it to be generally advisable to make it at least about 85% of such value.

As the gas expelled through said port escapes through the cap orifices, the reactive forces produced on said cap substantially neutralize each other, and thus prevent the sudden creation of a large thrust on the motor or any vehicle on which it is mounted.

While in the simplest form of our invention, such orifices are of uniform dimensions and are equally spaced about a neutral or central axis Y—Y of the cap, this is not necessary so long as the dimensions of the orifices and positions of such orifices are so related as to permit gas to escape therefrom in different directions and at such rates that the reaction forces of the gases escaping from the orifices substantially neutralize each other.

From the foregoing explanation of our invention it is seen that we have succeeded in providing a simple means for releasing gas from the combustion chamber of a rocket motor in the event that excessive pressures are produced therein due to unexpected burning of a charge over a larger area than intended, and that we have provided means for permitting such gas to escape from the motor chamber without the creation of an excessive thrust.

We claim:

1. A heat protected diaphragm for use with high pressure containers subjected to a high temperature which tends to destroy the diaphragm, said diaphragm being of rigid material adapted to rupture at a pressure higher than the normal pressure in the container and having a heat resistant coating covering its surface which is exposed to the high temperature, said coating being soft and flowable at the high temperature so that the pressure at which the diaphragm ruptures is determined primarily by the physical characteristics of the diaphragm.

2. A heat protected metal diaphragm for use in a receptacle containing high pressure gas at a high temperature which tends to melt the diaphragm, said diaphragm being proportioned to rupture at a pressure higher than the normal pressure in the receptacle, and a heat resistant coating covering the surface of the diaphragm which is exposed to the high temperature, said coating being soft and flowable at the high temperature, so that the pressure at which the diaphragm ruptures is determined primarily by the physical characteristics of the diaphragm.

3. A diaphragm according to claim 2 in which the heat resistant coating is a mixture of fireclay and glycerine.

FRANK J. MALINA.
MARK M. MILLS.